(12) United States Patent
Vong (10) Patent No.: US 9,955,823 B2
(45) Date of Patent: May 1, 2018

(54) AUTONOMOUS CHEF

(71) Applicant: Tony Kahn Vong, Sacramento, CA (US)

(72) Inventor: Tony Kahn Vong, Sacramento, CA (US)

( * ) Notice: Subject to any disclaimer, the term of this patent is extended or adjusted under 35 U.S.C. 154(b) by 536 days.

(21) Appl. No.: 14/461,365

(22) Filed: Aug. 16, 2014

(65) Prior Publication Data
US 2016/0045055 A1 Feb. 18, 2016

(51) Int. Cl.
*A47J 44/00* (2006.01)

(52) U.S. Cl.
CPC ..................................... *A47J 44/00* (2013.01)

(58) Field of Classification Search
CPC .................................. A47J 27/12; A47J 44/00
USPC ............................................................ 99/326
See application file for complete search history.

(56) References Cited

U.S. PATENT DOCUMENTS

| | | | | |
|---|---|---|---|---|
| 1,867,996 A * | 7/1932 | Baer | ...................... | A63G 27/00 472/3 |
| 5,046,914 A * | 9/1991 | Holland | ................... | B25J 5/007 414/680 |
| 5,421,318 A * | 6/1995 | Unruh | ................. | A47J 37/0731 126/25 A |
| 5,740,572 A * | 4/1998 | Hannant | ............ | A61G 13/1245 5/624 |
| 6,036,988 A * | 3/2000 | Lemme | .................. | A23N 12/10 34/596 |
| 2003/0205147 A1* | 11/2003 | Schackmuth | ......... | B65B 43/305 99/407 |
| 2005/0193901 A1* | 9/2005 | Buehler | .................... | A23L 5/10 99/468 |
| 2008/0257169 A1* | 10/2008 | Tienor | ................. | A47J 37/0611 99/377 |

OTHER PUBLICATIONS

Mark Wilson, Asahi Beer Robot, Sep. 10, 2016, Gizmodo.*

* cited by examiner

*Primary Examiner* — David Angwin
*Assistant Examiner* — Spencer h Kirkwood
(74) *Attorney, Agent, or Firm* — Chen-Chi Lin (57) ABSTRACT

A system when coupled with a material inputting, material holding, and washing device is a fully automated robotized cooking system. Computer control what material is inputted in the Cooking Chambers, the correct time and degree of heat, required amount of rotation, placing the cooked item in the bowl, and washing the Cooking Chamber. The device have horizontal rotation, like a ferris wheel, that keep each Cooking Chambers horizontally until rotation is required. The Pivoter pivot the Cooking Chambers up or down at any position in the rotation. There can be up to 6 Cooking Chambers independently operating at the same time. This invention can cook up to six different food items at the same time twenty four hours a day.

11 Claims, 9 Drawing Sheets

AUTONOMOUS CHEF

BACKGROUND OF THE INVENTION

1. Field of the Invention

The present invention relates to an Automatic Cooking System, and particularly to an Automatic Cooking System which cook the food, place it on a container, and then clean itself. The most important part of the inventions, the capability of Self-Cleaning and Transferability of the items in the Cooking Chambers from one to another.

2. Description of Related Art

U.S. Pat. No. 8,334,004 is an automatic cooking device, but it doesn't have abilities to clean itself. Cleaning the device used for cooking is important, as food are removed from the device trace amount of food is left behind. This can cause contamination to other food. It can result in over or under cooking of new cooking item.

U.S. Pat. No. 4,919,950 is another automatic cooking device, but it lacks ability to transfer cooked items or liquid from one Cooking Chamber to the other. Without this ability, when making fried food like french fries you will need something to strain out the oil.

SUMMARY OF THE INVENTION

The main object of the invention is to provide the operator cooked food whenever they want it. Business owner, Vending Machine operator, and Individual can have one in there home to get freshly cooked food 24 hours a day.

The system when integrated with a food feeding, food placing, and cleaning device will be a fully automated robotic system. A user tell the computer what they want. The computer select the correct Food Container and empty it in the Cooking Chamber. The computer apply the appropriate amount of heat and duration to the heating elements. The computer rotate/flip the Cooking Chamber enough time to cook the food. When the food is cooked the Arm rotate the Cooking Chamber above the bowl. The Pivoter pivot the Cooking Chamber downward to empty cooked food onto the Bowl. The Arm then move the Cooking Chamber above the Washer device. The Pivoter pivot the Cooking Chamber downward and the Washer device move upward. The Cooking Chamber rotate/spin while the Washer spray high pressurized cleaning solution in and outside the Cooking Chamber. The Cooking Chamber is now cleaned and ready to receive the next order.

DETAILED DESCRIPTION OF THE INVENTION

Figure 1:
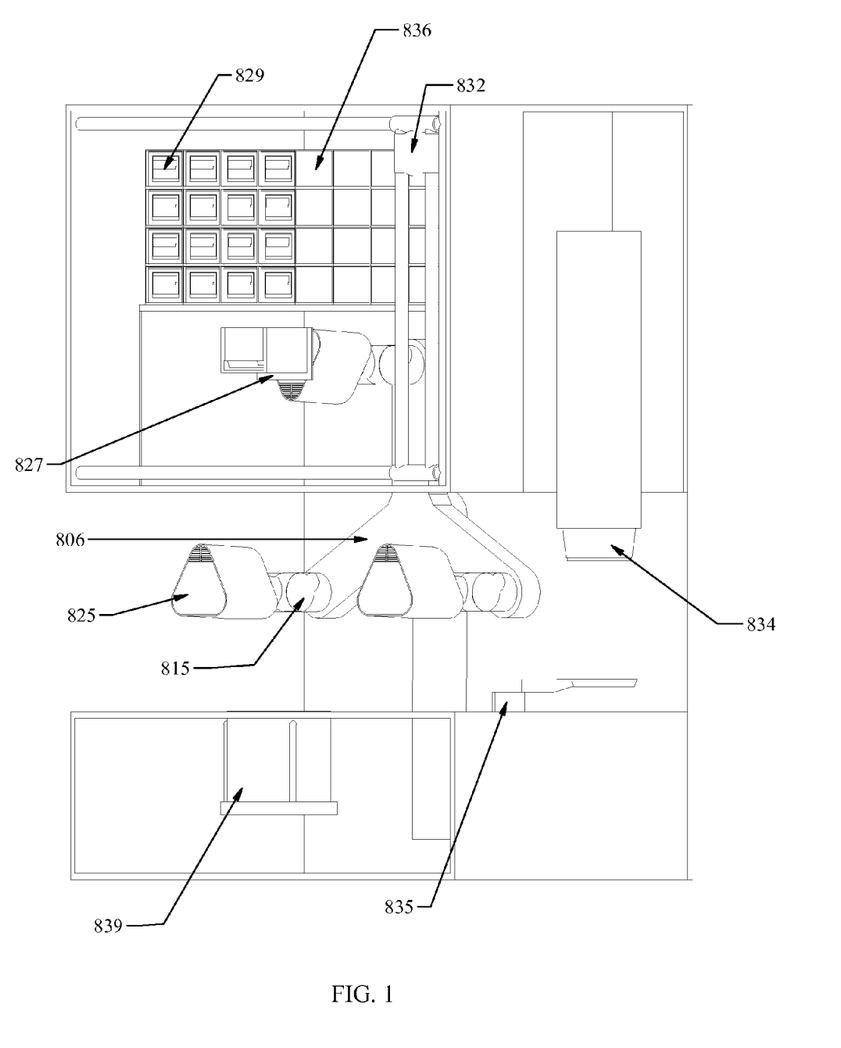
FIG. 1 is a Perspective View of the Autonomous Chef.

FIG. 1 show one aspect of the Autonomous Chef. It's comprise of a Material Feeding Device 832, Cooked Food Holding Device 835, Washer Device 839, and three Cooking Chambers 825 attached to a rotating Arm 806. Food is prepared and stored in food container 829 which is placed in the storage shelf 836.

Figure 2A:
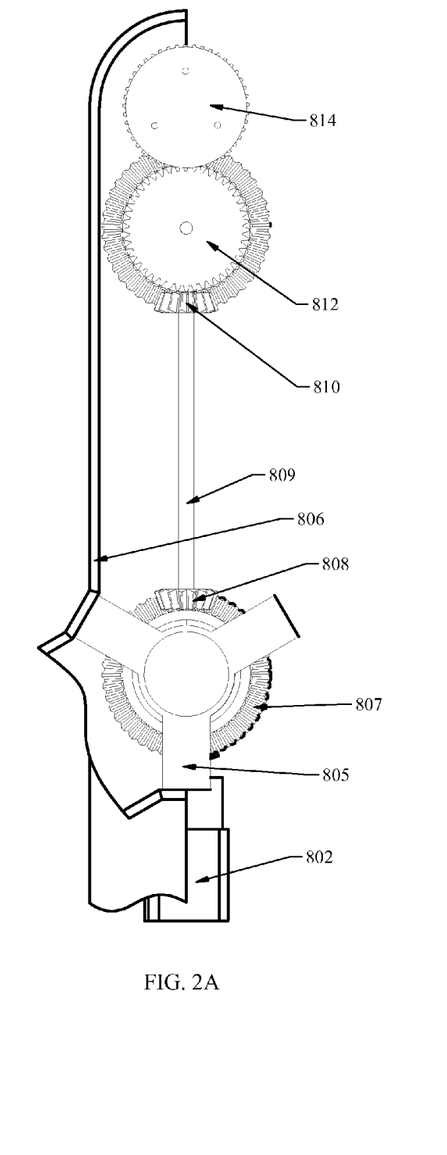
FIG. 2A-B is the Front/Left Partial Section View of the arm and base showing how it keeps the Cooking Chambers Horizontal at any position of the Arm rotation.
Figure 2B:
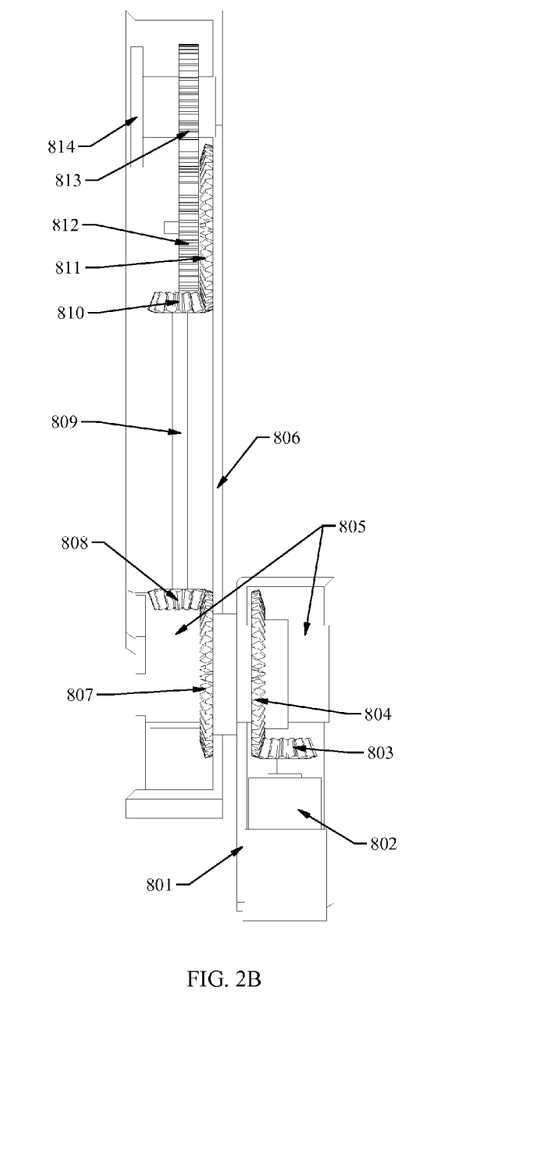

FIG. 2A-B show how the Cooking Chambers stay horizontal. In the Base 801, motor 802 rotate Bevel Gear 803 and 804 causing Arm Rod 805 to rotate Arm 806. Bevel Gear 807 is stationary. As Arm 806 rotate it cause Bevel Gear 808 to rotate. When Bevel Gear 808 rotate it also rotate Rod 809, Bevel Gear 810 and 811. Bevel Gear 811 is attached to Spur Gear 812. When Spur Gear 812 rotate, it rotate Spur Gear 813. Cooking Chamber Connecting Rod 814 is attached to Spur Gear 813. All this said rotation keep Cooking Chamber Connecting Rod 814 to stay in a horizontal position.

Figure 3A:
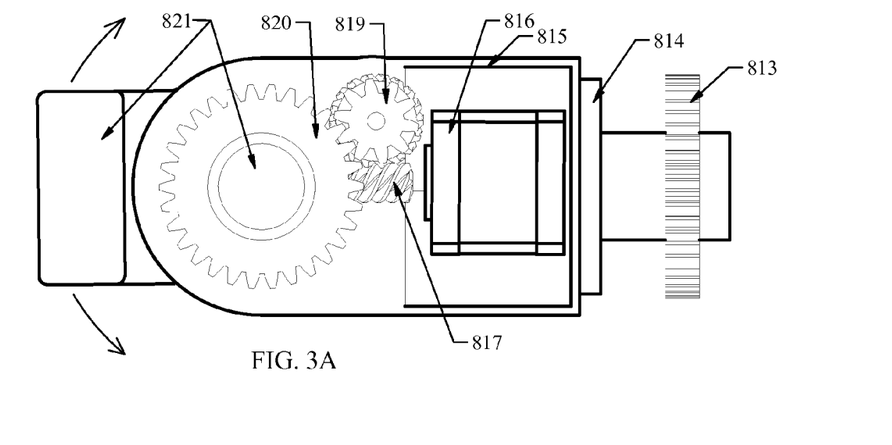
FIG. 3A-B is the Left/Top Partial Section View of the Arm and Pivotal Housing showing how the Cooking Chambers Rotate, move upward, and downward.
Figure 3B:
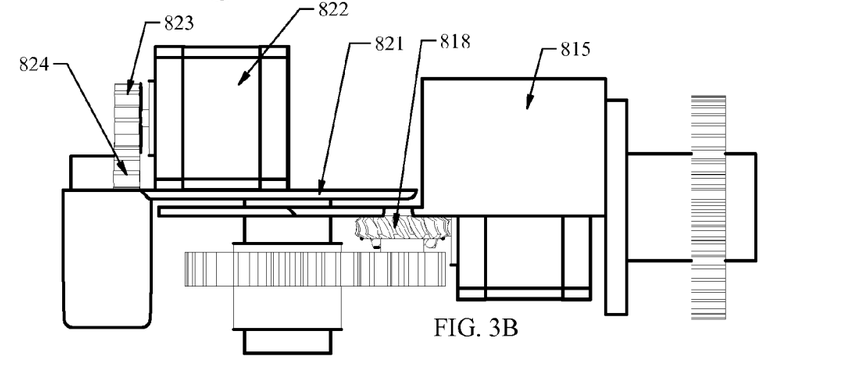
Figure 3C:
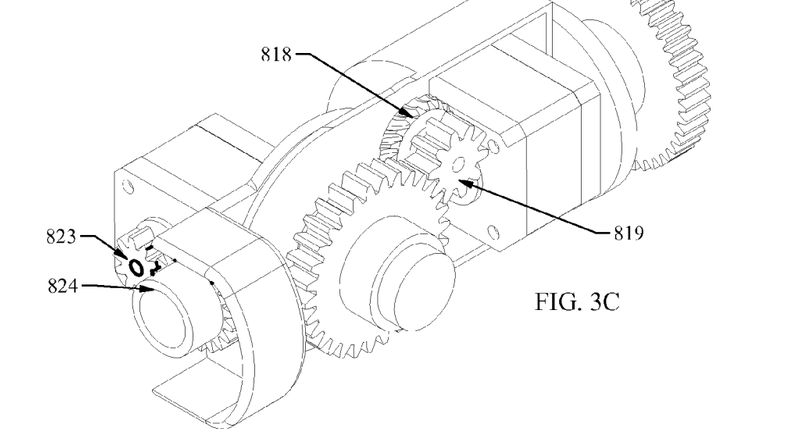
FIG. 3C is a Perspective Partial View of FIG. 3A-B.

FIG. 3A-C show how the Cooking Chambers pivots and rotate. Pivoter Housing 815 is attached to Cooking Chamber Connecting Rod 814. Motor 816 rotate Worm 817, rotating Worm Gear 818. Spur Gear 819 is connected to Worm Gear 818. Spur Gear 819 cause Spur Gear 820 to rotate. Cooking Chamber Rotator Housing 821 is attached to Spur Gear 820. So, when Motor 816 rotate clockwise or counter-clockwise it cause Cooking Chamber to Pivot up or down.

Motor 822 rotate Spur Gear 823 and 824. Spur Gear 824 have Rod connecting to it. The Cooking Chamber is connected to the Rod. When Motor 822 rotate it cause the Cooking Chamber to spin, flip, or rotate.

Figure 4A:
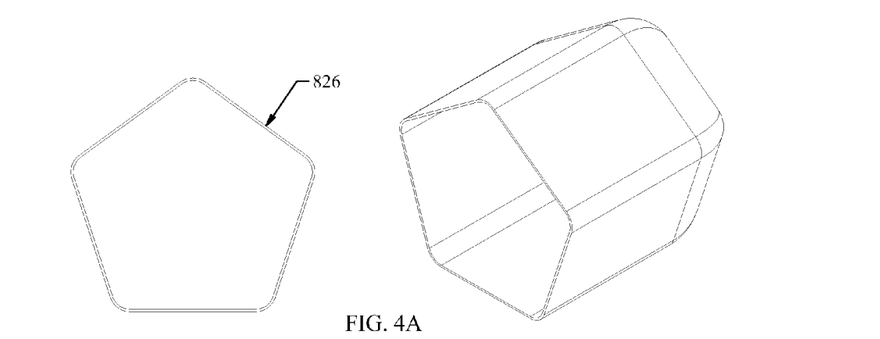
FIG. 4A-B show the different type of Cooking Chambers that can be used in the present invention.
Figure 4B:
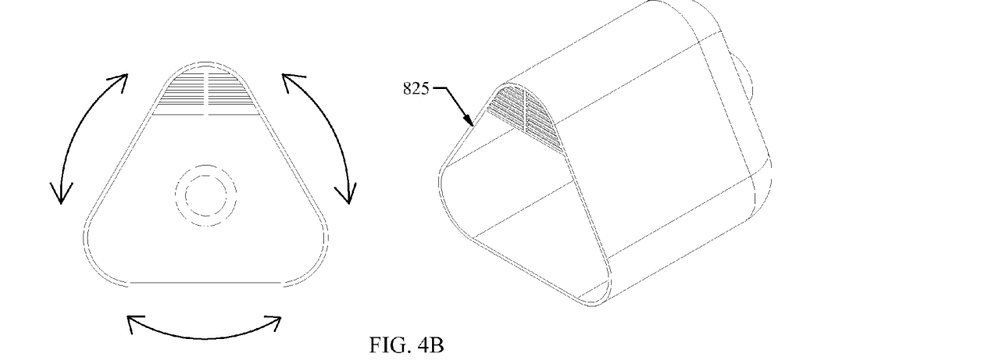

FIG. 4A-B show different variation of Cooking Chambers. All the Cooking Chambers have Heating elements embedded in it. Cooking Chamber 825 have a Strainer built in it. The strainer is used to strain out liquid like oil. Cooking Chamber 826 doesn't have a strainer and is good for stir-fry cooking. This is just two example, there can be a lot more.

Figure 4C:
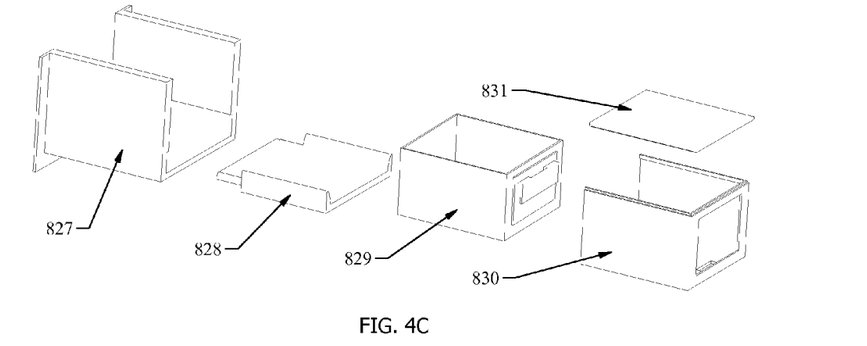
FIG. 4C is a breakdown of the Food Container and Dispenser Track.

FIG. 4C show how the food is stored and emptied into the Cooking Chambers. Food is put in the Food Sliding Container 829, which is stored inside Food Sliding Container Housing 830. Food Sliding Container Housing Cap 831 close up the food. Food Container Sliding Track 828 Slide into Sliding Track Guide 827. This is how food material is emptied into the Cooking Chambers.

Figure 5A:
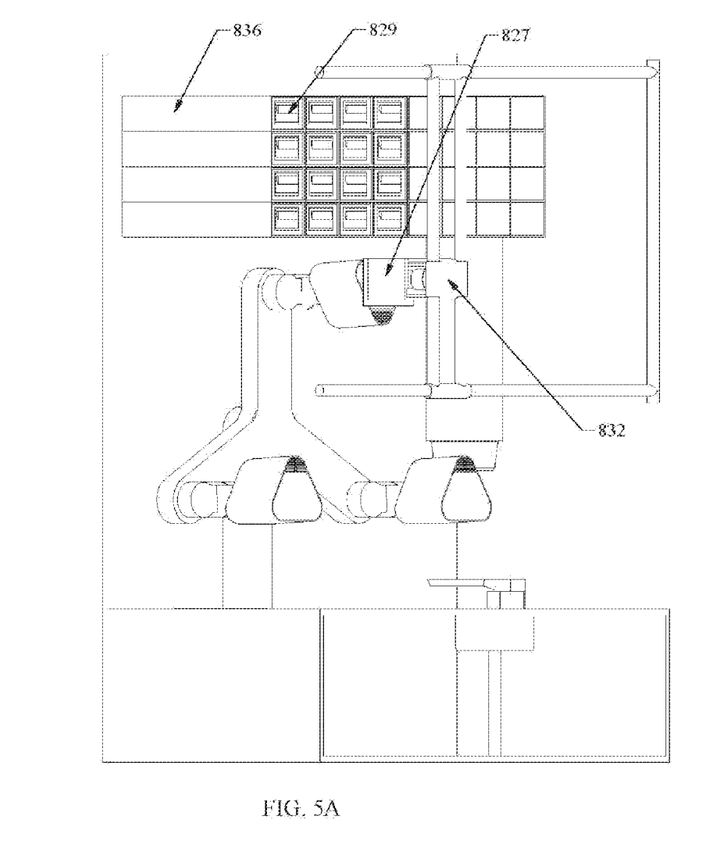
FIG. 5A is a perspective view of the Autonomous Chef with the Material Feeding Device emptying content into the Cooking Chamber.
Figure 5B:
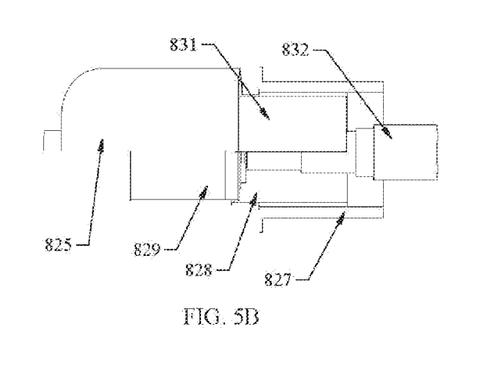
FIG. 5B-C is a Left/Top Partial Section view of the Food Container inside the Cooking Chamber.
Figure 5C:
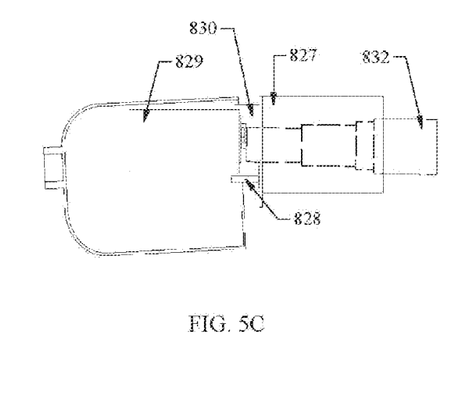

FIG. 5A-C show how the food material is emptied into the Cooking Chamber 825. After the consumer select the food they want, Material Feeding Device 832, pull the selected Food Sliding Container 829 from the Food Storage Shelf 836. The food material is emptied into the Cooking Chamber 825 when Material Feeding Device 832 push Food Sliding Container 829 through Food Sliding Container Housing 830 and Sliding Track Guide 827.

Figure 6:
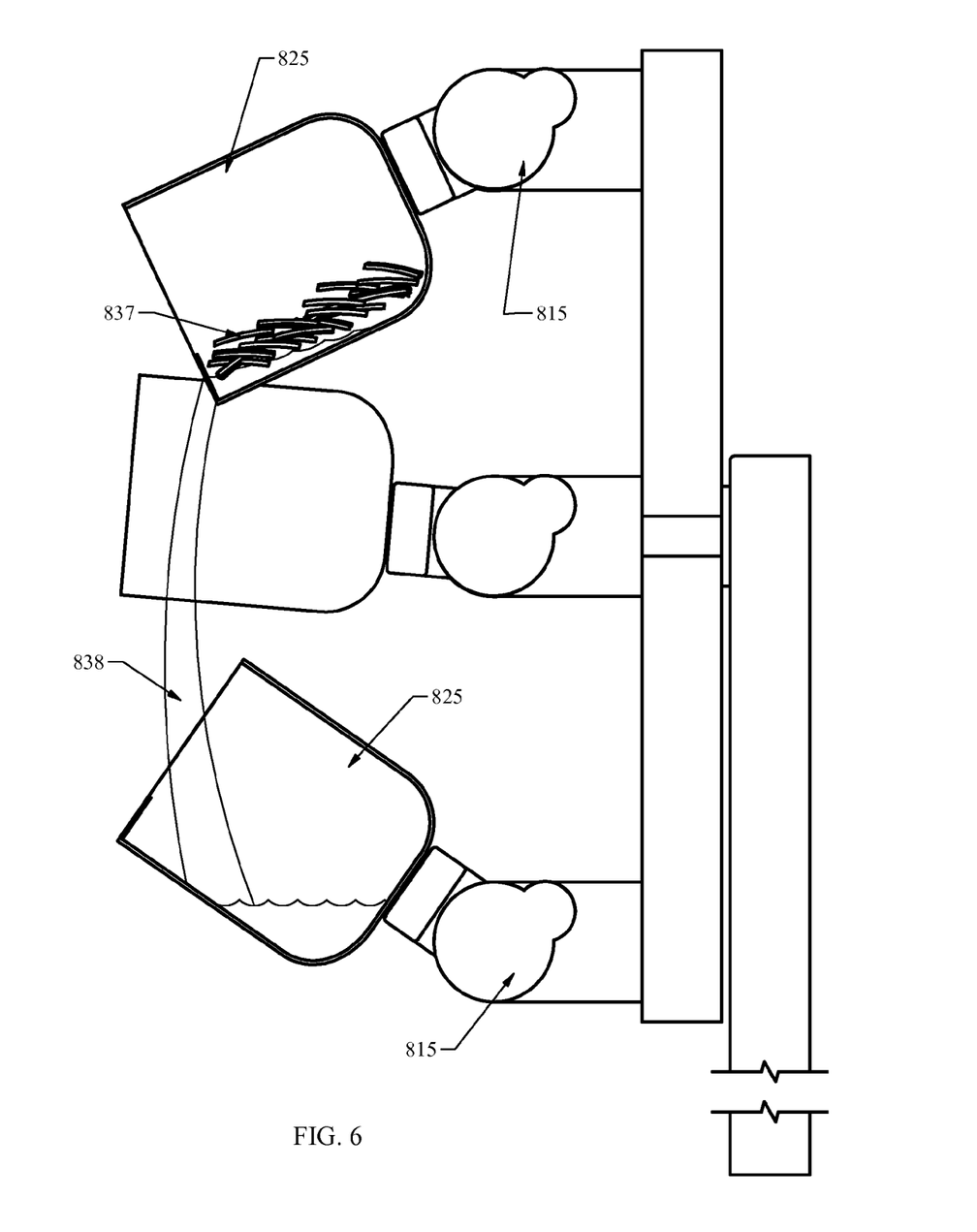
FIG. 6 is a Left Partial Section View of the top Cooking Chamber transferring oil to the lower Cooking Chamber while the Strainer hold back the French Fries.

FIG. 6 show how oil is strained from one Cooking Chamber 825 to another. The Pivoter 815 Pivot one Cooking Chamber 825 up and one down. Oil 838 is strained from one Cooking Chamber 825 to another, leaving the French Fries 837.

Figure 7A:
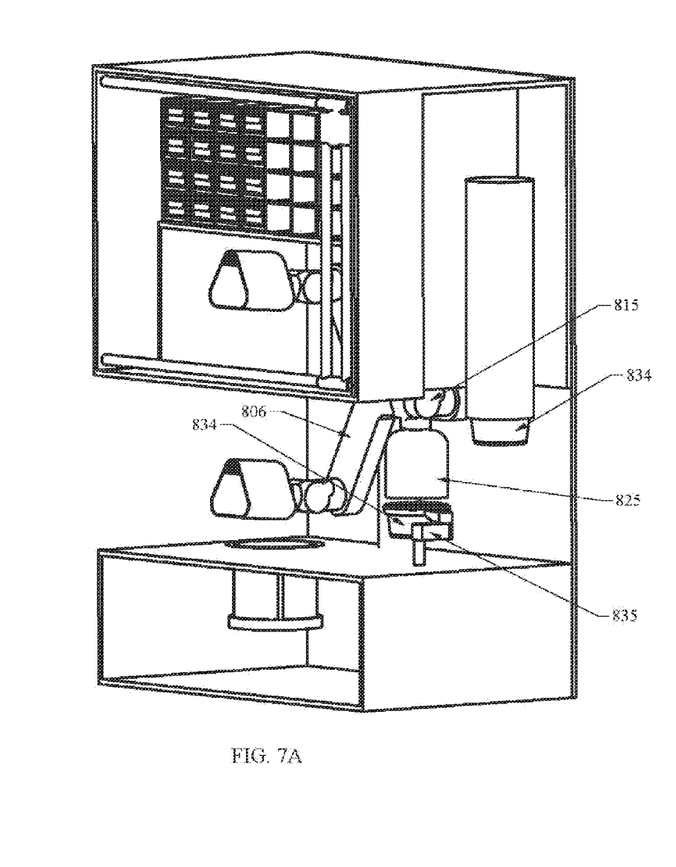
FIG. 7A is a perspective view of the Automatic Robotic Cooking System with the Cooking Chamber emptying the cooked content into the Bowl.
Figure 7B:
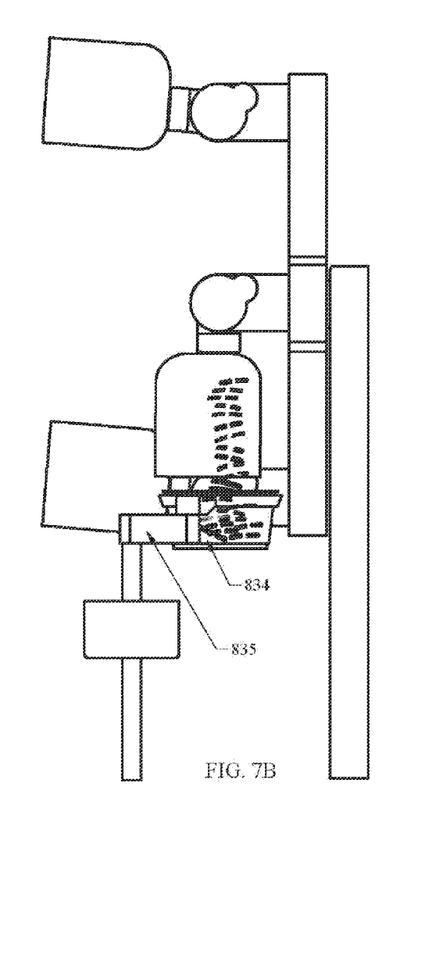
FIG. 7B is a Left Partial Section View of FIG. 7A.

FIG. 7A-B show how cooked food is emptied into the Bowl 834. After the food is cooked Arm 806 rotate Cooking Chamber 825 above Cooked Food Holding Device 835. The Pivoter 815 Pivot the Cooking Chamber 825 downward emptying the content into the Bowl 834. Note the other two Cooking Chambers staying horizontally.

Figure 8A:
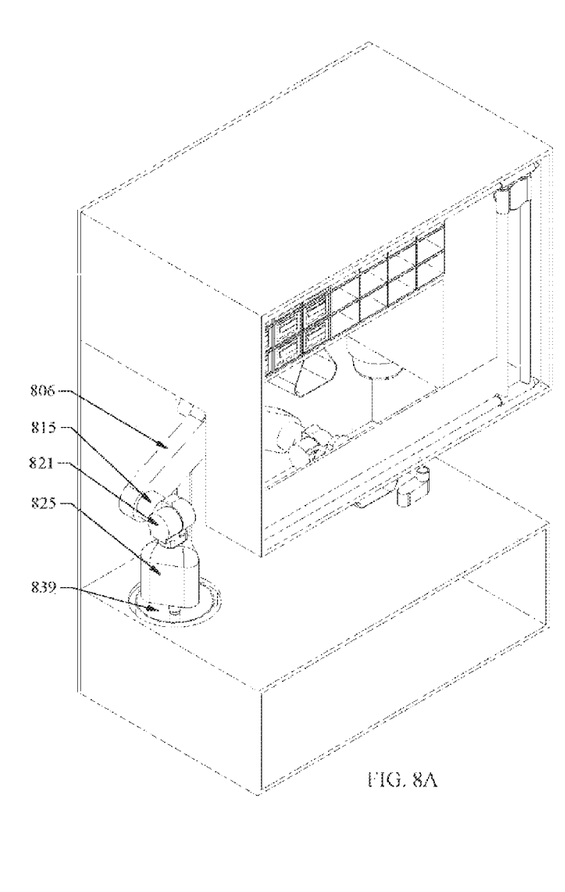
FIG. 8A is a perspective view of the Autonomous Chef with the Cooking Chamber pivoted downward toward the Washer Device.
Figure 8B:
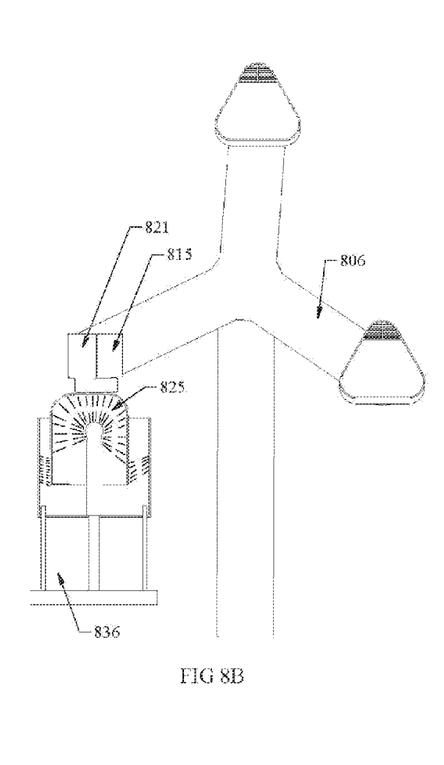
FIG. 8B is a Front Partial Section View of the Washer Device cleaning the Cooking Chamber.

FIG. 8A-B show how the Cooking Chamber 825 is Cleaned. After the cooked food is emptied, Arm 806 rotate that Cooking Chamber above Washer Device 839. Pivoter 815 pivot the Cooking Chamber 825 downward while the Washer Device 839 move upward. As the Rotator 821 spin the Cooking Chamber 825 the Washer Device 839 Spray out a high pressure water with cleaning solution to the Cooking Chamber 825 inside and outside.

Figure 9:
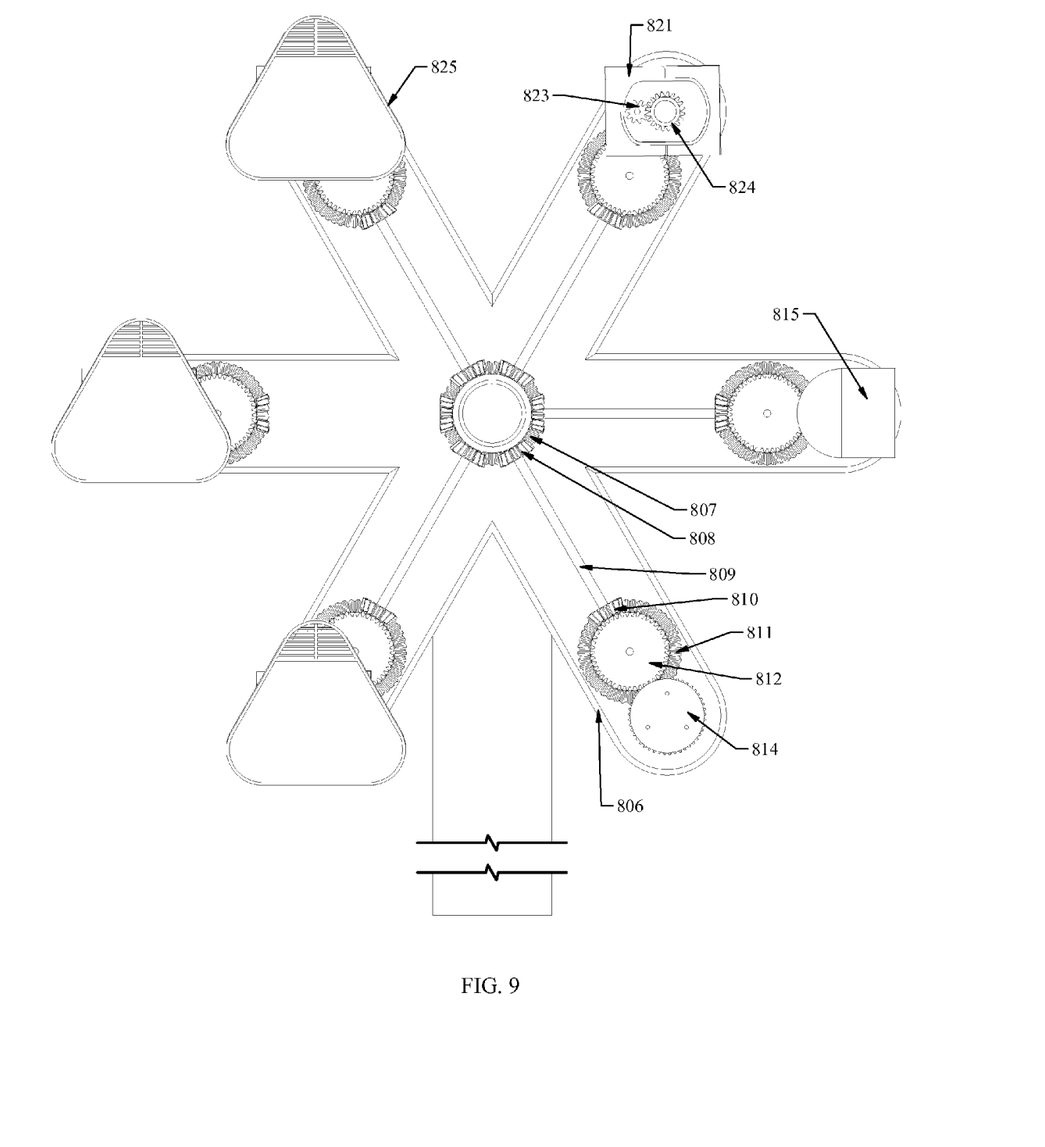
FIG. 9 is a Front Partial Section View of the Autonomous Chef with 6 Cooking Chambers.

FIG. 9 show the Autonomous Chef with six Cooking Chambers. All the previous drawings show only three Cooking Chambers. By just adding three more Arm 806 and using the same Bevel Gear 807 we can achieve a total of six Cooking Chambers that act as independently as with just three Arms and Cooking Chambers.

What is claimed is:

1. An autonomous chef comprising:
   a wheel-shaped assembly comprising:
      a stationary sub-assembly; and
      a movable sub-assembly comprising:
         three or more arms extending away from the stationary sub-assembly, the three or more arms rotating about a first direction;
         three or more connecting rods;
         three or more pivoters;
         three or more rotators; and
         three or more cooking chambers;
         each cooking chamber being attached to a respective rotator;
         each rotator being attached to a respective pivoter;
         each pivoter being attached to a respective arm;
      a material feeding device;
      a food holding device; and
      a washer device;
   wherein each connecting rod is between a respective arm and a respective pivoter;
   wherein said each connecting rod stays in a respective horizontal position parallel to a second direction perpendicular to the first direction during the rotation of the respective arm;
   wherein food material is transferred from a first selected cooking chamber to a second selected cooking chamber when the first and second selected cooking chambers are aligned along a third direction perpendicular to the first and second directions and the first and second selected cooking chambers pivot to a first and second pre-determined angles with respect to the second direction respectively.

2. The autonomous chef of claim 1, wherein the wheel-shaped assembly is a ferris wheel-shaped assembly.

3. The autonomous chef of claim 1, wherein the material feeding device is higher than the stationary sub-assembly in the third direction and the washer device is lower than the stationary sub-assembly in the third direction.

4. The autonomous chef of claim 1, wherein high pressure water with cleaning solution from the washer device is sprayed into a first selected cooking chamber when a respective pivoter connected to the first selected cooking chamber and the washer device are aligned along a third direction perpendicular to the first and second directions; the first selected cooking chamber pivot to a first pre-determined angle with respect to the second direction; and the washer device moves upward along the third direction.

5. The autonomous chef of claim 1, wherein the three or more pivoters are at a same radial distance from the first direction.

6. The autonomous chef of claim 1, wherein said each arm has a proximal end near the stationary sub-assembly and a distal end opposite the proximal end; and wherein a respective cooking chamber is closer to the distal end than the proximal end.

7. The autonomous chef of claim 6, wherein the stationary sub-assembly is of a circular shape and the proximal ends of the three or more arms are equally spaced around a circumference of the stationary sub-assembly.

8. The autonomous chef of claim 1, wherein the movable sub-assembly further comprises:
   three or more connecting rods; and
   three or more gear sets; each gear set comprising:
      a first bevel gear;
      a first rod;
      a second bevel gear;
      a third bevel gear;
      a first spur gear; and
      a second spur gear;
      the first bevel gear being engaged with the first rod;
      the first rod being engaged with the second bevel gear;
      the second bevel gear being engaged with the third bevel gear;
      the third bevel gear being engaged with the first spur gear;
      the first spur gear being engaged with the second spur gear;
   wherein each connecting rod is engaged with the second respective spur gear; and
   wherein a respective gear set keeps said each connecting rod staying in the respective horizontal position parallel to the second direction perpendicular to the first direction during the rotation of the respective arm.

9. The autonomous chef of claim 1, wherein said each cooking chamber has a heating element and wherein at least one of the three or more cooking chambers has a strainer.

10. The autonomous chef of claim 1, wherein the movable sub-assembly further comprises:
   three or more connecting rods; and
   three or more gear sets; each gear set comprising:
      a first bevel gear;
      a first rod;
      a second bevel gear;
      a third bevel gear;
      a first spur gear; and
      a second spur gear;
      the first bevel gear being engaged with the first rod;
      the first rod being engaged with the second bevel gear;
      the second bevel gear being engaged with the third bevel gear;
      the third bevel gear being engaged with the first spur gear;

the first spur gear being engaged with the second spur gear;

wherein each connecting rod is engaged with a respective second spur gear;

wherein a respective gear set keeps said each connecting rod staying in the respective horizontal position parallel to the second direction perpendicular to the first direction during the rotation of the respective arm; and wherein the first bevel gear is directly contacted and engaged with a stationary bevel gear of the stationary sub-assembly.

11. The autonomous chef of claim 10, wherein the third bevel gear is directly contacted and engaged with the first spur gear and wherein the first spur gear is directly contacted and engaged with the second spur gear.

* * * * *